United States Patent [19]

Kopel et al.

[11] Patent Number: 5,382,213

[45] Date of Patent: Jan. 17, 1995

[54] MECHANICAL DEVICE FOR TOOL CLAMPING IN ADAPTORS

[75] Inventors: Shimon Kopel, Nahariya; Gideon Drori, Mitzpe Hila, both of Israel

[73] Assignee: Iscar Ltd., Tefen, Israel

[21] Appl. No.: 102,036

[22] Filed: Aug. 4, 1993

[30] Foreign Application Priority Data

Aug. 5, 1992 [IL] Israel ......................................... 102732

[51] Int. Cl.⁶ ........................ B73Q 3/157; B73Q 3/12; B23B 31/10
[52] U.S. Cl. .......................................... 483/7; 29/705; 279/900
[58] Field of Search ............... 483/4, 5, 8, 7, 32, 483/31; 279/902, 900, 91; 29/33 R, 33 K, 705; 81/52, 54

[56] References Cited

U.S. PATENT DOCUMENTS

| | | | |
|---|---|---|---|
| 3,380,324 | 4/1966 | Hillman | 81/54 |
| 3,680,436 | 8/1972 | Marsland | 279/900 X |
| 3,797,335 | 3/1974 | Amtsberg et al. | 81/10 |
| 4,151,642 | 5/1979 | Holland et al. | 483/8 X |
| 4,456,271 | 6/1984 | Kern et al. | 279/91 |
| 4,581,808 | 4/1986 | Lanson et al. | 29/558 |
| 4,761,877 | 8/1988 | Rupp | 483/32 |
| 5,035,556 | 7/1991 | Lamotte et al. | |

FOREIGN PATENT DOCUMENTS

| | | | |
|---|---|---|---|
| 483531 | 7/1917 | France . | |
| 2607048 | 5/1988 | France | B23Q 3/157 |
| 7513937 | 4/1975 | Germany . | |
| 3208621A1 | 9/1983 | Germany | B23Q 3/157 |
| 3604635 | 2/1985 | Japan . | |
| 2246619 | 1/1971 | Switzerland . | |
| 2026354 | 6/1980 | United Kingdom . | |
| 560784 | 12/1977 | U.S.S.R. . | |

Primary Examiner—William Briggs
Attorney, Agent, or Firm—Pennie & Edmonds

[57] ABSTRACT

A tool locking and releasing device having a rotatably driven spindle rotatably mounted on a support frame. A socket is formed in the spindle coaxial with an axis of rotation thereof and is adapted to receive a tool holder and to retain it against relative rotational movement. Wrench means is provided to grip a tool locking member so that upon the application of a rotary drive to the spindle in a first directional sense the tool holder is rotated and the tool locking member is tightened with a predetermined torque, and upon the rotation of the spindle in an opposite directional sense the tool locking member is loosened.

3 Claims, 3 Drawing Sheets

MECHANICAL DEVICE FOR TOOL CLAMPING IN ADAPTORS

FIELD OF THE INVENTION

This invention relates to a tool locking and releasing device for use in locking and releasing cutting tools in and from tool holders.

BACKGROUND OF THE INVENTION

Machine tools are increasingly designed for use with a number of tool heads which are sequentially mounted on the machine tool as required. There is therefore a clear requirement that the tool heads be readily available for use. Each tool head comprises a tool holder designed to be mounted in a machine tool spindle. In each tool holder there is mounted an appropriate cutting tool which is locked in position by a tool locking member such as a locking nut or ring. Ready and rapid replacement of the cutting tools is clearly a prerequisite for achieving an uninterrupted supply of tool heads for use as required.

Hitherto, the replacement of the cutting tools in the tool holders has been effected manually by the manual loosening, by means of an appropriate wrench, of the tool locking member, the removal of the cutting tool and its replacement by another cutting tool, and the subsequent tightening of the locking member so as to retain the cutting tool securely in position in the tool holder. Clearly, such a manual regime is very time consuming. In addition, the manual tightening of the tool locking member carries with it the consequence that differing tool heads may have the cutting tools secured therein to differing extents as a result of differing degrees of tightening being imparted to the locking members.

There have been various prior proposals for the provision of power wrenches or otherwise to mechanize tool changing in machine tools (e.g. U.S. Pat. Nos. 3,380,324; 3,797,335), but in general they have been of relatively cumbersome, complicated construction.

It is an object of the present invention to provide a new and improved mechanized tool locking and releasing device in which the above-referred-to disadvantages are substantially reduced or overcome.

BRIEF DESCRIPTION OF THE INVENTION

According to the present invention, there is provided a tool locking and releasing device comprising a support frame; a spindle rotatably mounted on said frame; a socket formed in said spindle coaxial with an axis of rotation of said spindle and adapted to receive and retain a tool holder against relative rotational movement; rotational drive means mounted on said frame and coupled to said spindle for rotational displacement of said spindle in first and second opposite directional senses; torque control means for limiting the drive torque transmitted to said spindle to a predetermined magnitude; a support column mounted on said frame and directed substantially parallel to said rotational axis; a wrench support arm, directed substantially normally to said column, slidably mounted at one end thereof on said column; a wrench handle retainably coupled to an opposite end of said support arm and having a wrench head adapted to grip a tool locking member; the arrangement being such that application of a rotary drive to said spindle in said first directional sense results in the rotation of said tool holder and the tightening of said tool locking member with a predetermined torque, and rotation of said spindle in said opposite directional sense results in the loosening of said tool locking member.

With such a device, when it is desired to replace a cutting tool in a tool holder, the tool holder is placed in the socket of the spindle so as to be rotatable with the spindle. The wrench support arm is manipulated so that the wrench head effectively grips the locking member, thereby inhibiting any rotational displacement of the locking member with respect to the support frame, and a rotational drive in a first directional sense is imparted to the spindle by the drive means, thereby rotating the tool head with respect to the locking member so as to loosen the locking member sufficiently for the cutting tool to be readily removable therefrom. The removed cutting tool is replaced by another cutting tool whose tool shank is inserted into the tool holder, and now a rotational drive in a second and opposite sense is transmitted to the tool holder from the motor, thereby resulting in the rotational displacement of the tool holder with respect to the locking member and the consequent tightening of the locking member by a predetermined torque and the secure mounting of the cutting tool in the tool holder. By virtue of the provision of the torque control means, the torque transmitted to the spindle and therefore to the tool holder is limited to a predetermined magnitude, and in this way it is ensured that all cutting tools are mounted in their respective tool holders and secured therein to the required degree.

BRIEF DESCRIPTION OF THE DRAWINGS

For a better understanding of the present invention, and to show how the same may be carried out in practice, reference will now be made to the accompanying drawings, in which.

DETAILED DESCRIPTION OF PREFERRED EMBODIMENT

Figure 1:
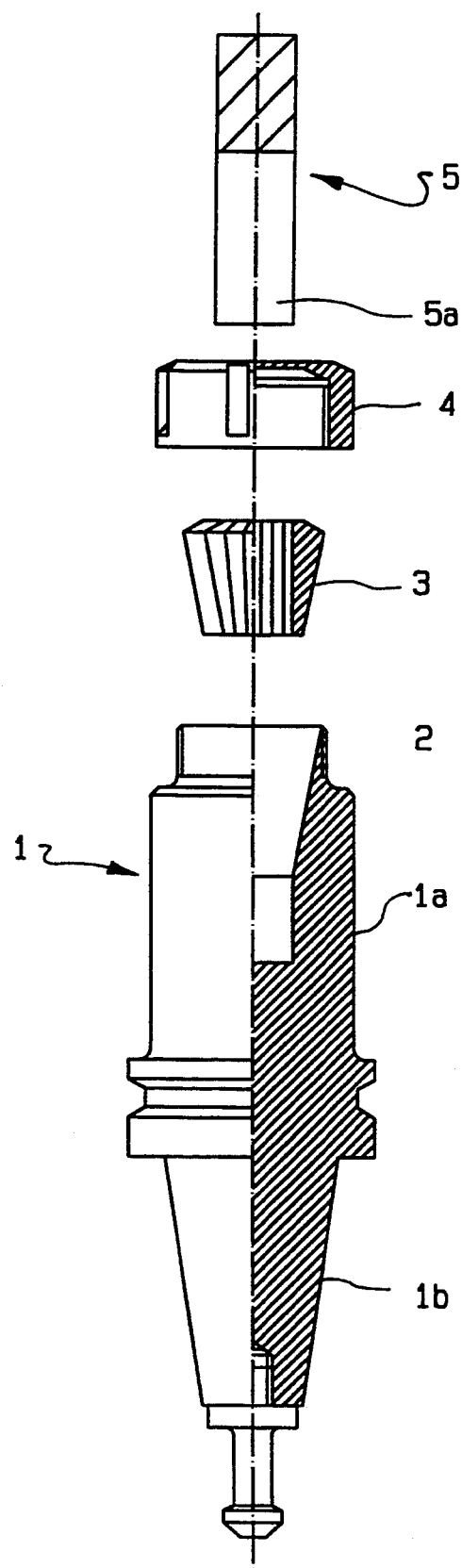
FIG. 1 is an exploded view of a tool head for use with a cutting, device in accordance with the present invention.
Figure 2:
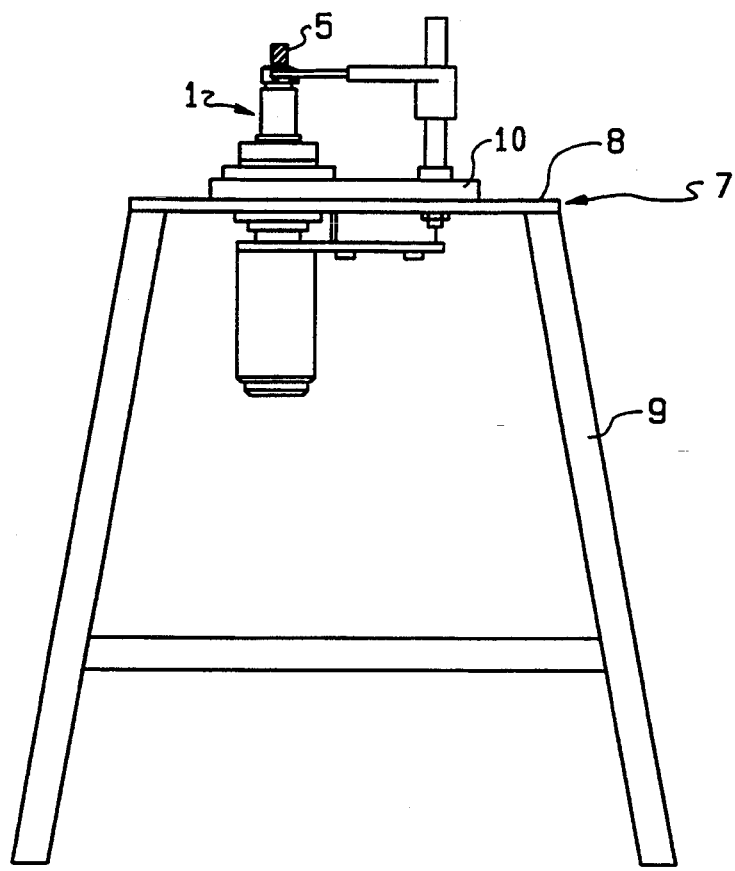
FIG. 2 is a side elevation of a tool locking and releasing device in accordance with the present invention.
Figure 3:
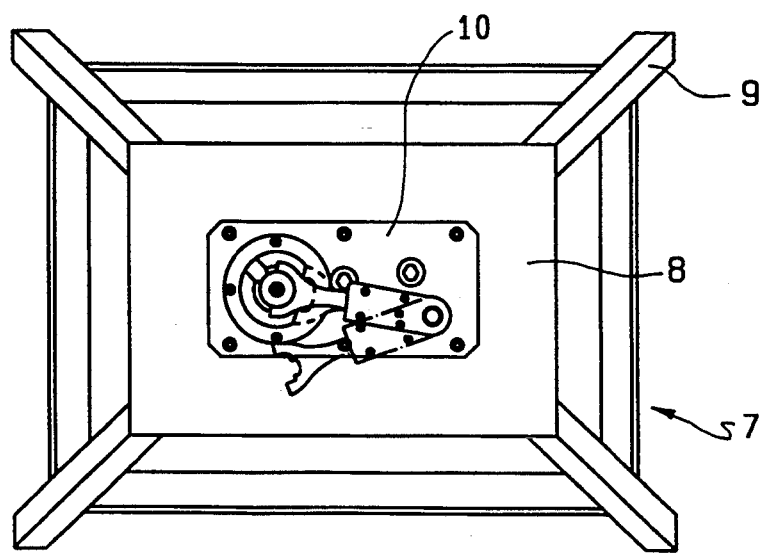
FIG. 3 is a plan view from above of the device shown in FIG. 2.

As seen in FIG. 1 of the drawings, a tool head comprises a tool holder 1 having an upper cylindrical portion 1a and a lower, tapering portion 1b. Formed in the upper cylindrical portion 1a is a socket 2. A collet 3 is designed to fit into the socket 2 and to be surrounded by a locking nut 4 (constituting a locking member). A cutting tool 5 is formed with a tool shank 5a which is designed to be fitted into the socket 2 via the locking nut 4 and collet 3.

With the fitting of the cutting tool shank 5a into the socket 2, the tightening of the locking nut 4 securely retains the cutting tool within the tool holder 1. It will be readily appreciated that, depending on the torque applied to the locking nut 4, the degree of retention of the cutting tool within the tool holder can be varied; thus, the higher the torque, the greater the retaining force exerted on the tool and the greater the displacement into the socket 2 of the tool shank 5. It is therefore clear that the ultimate retaining force and also the final location of the cutting tool extremity with respect to the tool holder 1 depends on the maximum turning torque applied to the locking nut 4.

Referring now to FIGS. 2 through 5 of the drawings, the tool locking and releasing device comprises a support frame 7 having an upper horizontal base frame 8 and support legs 9. A base plate 10 is mounted on the horizontal base frame 8. Extending through a suitable aperture formed in the base plate 10 and secured thereto is a cylindrical spindle support structure 11. Rotatably mounted within the spindle support structure 11, via bearings 12, is a rotatable spindle 13 in which is formed a socket 14 shaped to receive the tapering tool holder portion 1b and so as to retain the latter against relative rotational motion thereof with respect to the spindle 13.

A drive motor 15 (constituting rotational drive means) is supported with respect to the base plate 10 by means of a motor mounting frame 16 secured to the base 10. A drive shaft 17 of the motor 15 is drive coupled to the spindle 13. The motor 15 is provided with torque control means 18 for limiting the torque to be transmitted to the spindle to a predetermined magnitude.

Mounted on the base plate 10 is a support column 19 which is substantially parallel to a rotational axis 21 of the drive shaft 17 and spindle 13. A wrench support arm 22 is formed at one end with a cuff 23 which is slidable on the support column 19, and receives at its other end a wrench handle 24 which terminates in a wrench head 25. The degree to which the wrench handle 24 extends beyond the wrench support arm 22 can be varied as required, and the wrench handle 24 can be clamped in position with respect to the wrench support arm 22 at the required degree of projection.

In use, a tool holder 1 is positioned within the socket 14 of the spindle 13 and is rotatable together with the spindle 13. In order to place the tool holder within the spindle 13, the wrench support arm 22, together with the wrench handle 24 and wrench head 25 are moved aside as clearly shown in FIG. 5 of the drawings.

Figure 4:
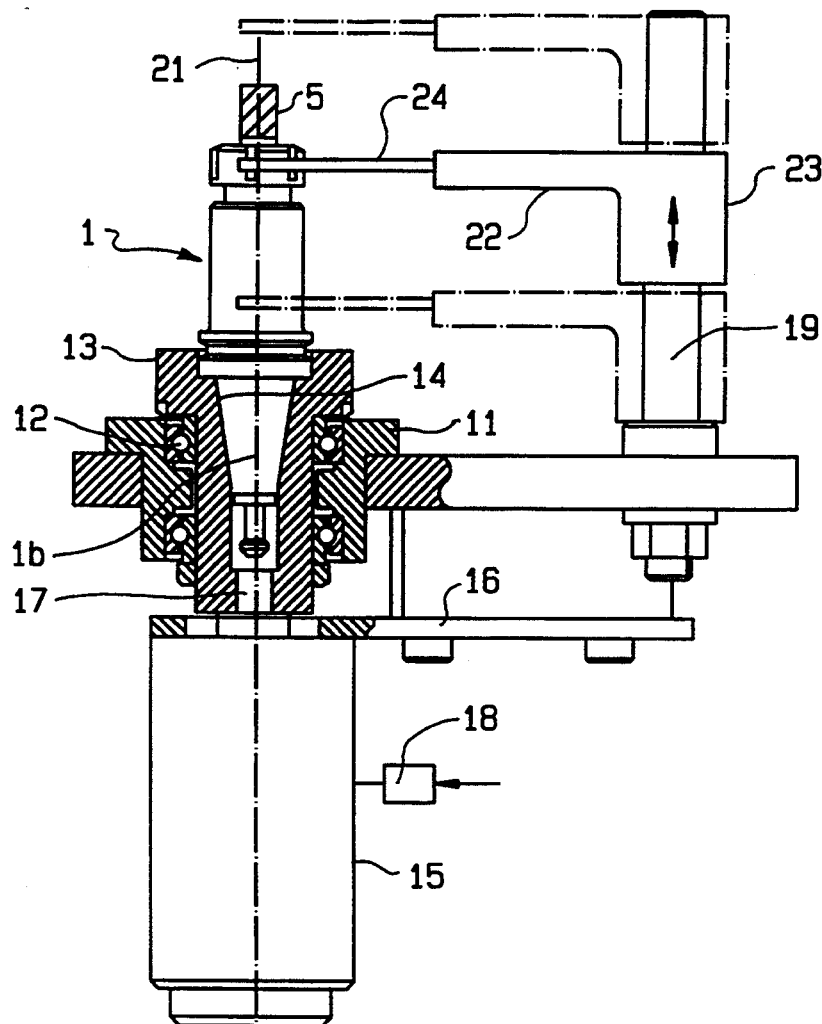
FIG. 4 is a view on an enlarged scale of a portion of the device shown in FIG. 2, partially longitudinally sectioned.

If now it is desired to loosen and remove the cutting tool 5 from the tool holder 1, where this cutting tool 5 is, as shown in the drawings, of lesser transverse dimensions than those of the locking nut 4, the wrench support arm is slidably displaced along the column 19 until it reaches its upper position shown in chain dotted lines in FIG. 4, whereupon the arm is then lowered until the wrench head 25 embraces the locking nut 4. A rotational drive in a first sense is now imparted from the motor 15 via the shaft 17 and spindle 13 to the tool holder 1, whilst at the same time the wrench head 25 inhibits any relative rotational movement of the locking nut 4. The rotation of the tool holder 1 results in the loosening of the locking nut 4, permitting the ready removal of the cutting tool 5.

Figure 5:
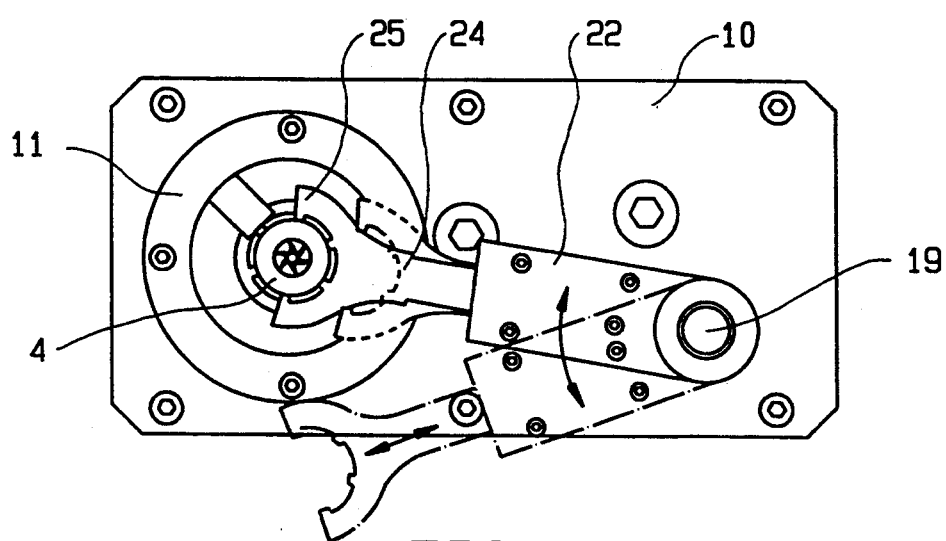
FIG. 5 is a view on an enlarged scale of a portion of the device shown in FIG. 3.

For the case where the lateral dimensions of the cutting tool 5 are greater than those of the locking nut 4, the gripping of the latter by the wrench head 25 is preceded by the following steps. The wrench support arm 22 is moved to the side as shown in FIG. 5 of the drawings, the wrench handle 24 is displaced inwardly with respect to the wrench support arm 22 and the latter is moved so as to be located adjacent the locking nut 9, again as shown in chain dotted lines in FIG. 5 of the drawings. The wrench handle 24 is now extended from the wrench support arm 22 until the wrench head 25 embraces the locking nut 4 and the procedure of loosening the latter (or, as to be explained below, the tightening) can proceed as described (or to be described).

With the replacement of the cutting tool 5 by a new cutting tool 5, the latter is fixed in position. With the wrench head 25 embracing the locking nut 4, a rotational drive in an opposite sense to that previously described is imparted by the motor 15 via the shaft 17 to the spindle 13, and thereby to the tool holder 1, whilst at the same time the locking nut 4 is retained against rotational movement by means of the wrench head 25. A consequential tightening of the locking nut 4 is effected. The provision of the torque control means 18 ensures that once the torque applied to the tool holder reaches the predetermined maximum, the drive to the tool holder is discontinued. In this way it is ensured that cutting tools are secured within the tool holders by a predetermined maximum torque. In consequence, the clamping force applied to the tool as well as the relative disposition of the cutting tool with respect to the tool holder are maintained constant. The tool holder with the replaced cutting tool can now be removed from the device (after the wrench handle 24 has been withdrawn into the wrench support arm 22).

It will be readily seen that the device just described affords a very simple and effective means for the rapid replacement of cutting tools from the tool holders, whilst at the same time ensuring that the cutting tools are retained in the tool holders by a substantially constant clamping force and in a substantially constant, relative disposition.

We claim:

1. A tool locking and releasing device comprising a support frame; a spindle rotatably mounted on said frame; a socket formed in said spindle coaxial with an axis of rotation of said spindle and adapted to receive and retain a tool holder against relative rotational movement; rotational drive means mounted on said frame and coupled to said spindle for rotational displacement of said spindle in first and second opposite directional senses; torque control means for limiting the drive torque transmitted to said spindle to a predetermined magnitude; a support column mounted on said frame and directed substantially parallel to said rotational axis; a wrench support arm, directed substantially normally to said column, slidably mounted at one end thereof on said column; a wrench handle retainably coupled to an opposite end of said support arm and having a wrench head adapted to grip a tool locking member, said wrench handle being axially displaceable with respect to said wrench support arm; the arrangement being such that application of a rotary drive to said spindle in said first directional sense results in the rotation of said tool holder and the tightening of said tool locking member with a predetermined torque, and rotation of said spindle in said opposite directional sense results in the loosening of said tool locking member.

2. A tool locking and releasing device according to claim 1, wherein said spindle is rotatably mounted via bearings on a spindle support structure which is in its turn mounted on said frame.

3. A tool locking and releasing device according to claim 1, wherein said wrench support arm is formed at said one end with a cuff member slidably mounted on said column.

* * * * *